US012744219B2

(12) United States Patent
Lee et al.

(10) Patent No.: US 12,744,219 B2
(45) Date of Patent: Sep. 22, 2026

(54) BINDER FOR SECONDARY BATTERY ANODE, METHOD FOR PREPARING SAME, AND SECONDARY BATTERY ANODE USING SAME

(71) Applicants: PUSAN NATIONAL UNIVERSITY INDUSTRY-UNIVERSITY COOPERATION FOUNDATION, Busan (KR); PUKYONG NATIONAL UNIVERSITY INDUSTRY-UNIVERSITY COOPERATION FOUNDATION, Busan (KR)

(72) Inventors: Jin Hong Lee, Busan (KR); Seung Geol Lee, Busan (KR); Kie Yong Cho, Busan (KR); In Hye Choi, Busan (KR); Eun Ji Kim, Gyeongsan-si (KR); Hyeok Jun Seo, Busan (KR); Yong Hun Lee, Busan (KR); Ho Jin Jung, Busan (KR); Young Je Kwon, Busan (KR); Jae Won Park, Busan (KR); Seon Gyeong Kang, Busan (KR)

(73) Assignees: PUSAN NATIONAL UNIVERSITY INDUSTRY-UNIVERSITY COOPERATION FOUNDATION, Busan (KR); PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 425 days.

(21) Appl. No.: 18/685,916

(22) PCT Filed: Aug. 23, 2022

(86) PCT No.: PCT/KR2022/012603
§ 371 (c)(1),
(2) Date: Feb. 23, 2024

(87) PCT Pub. No.: WO2023/027481
PCT Pub. Date: Mar. 2, 2023

(65) Prior Publication Data

US 2024/0372102 A1 Nov. 7, 2024

(30) Foreign Application Priority Data

Aug. 24, 2021 (KR) ........................ 10-2021-0111690

(51) Int. Cl.
*H01M 4/62* (2006.01)
*H01M 4/02* (2006.01)
*H01M 10/0525* (2010.01)

(52) U.S. Cl.
CPC ....... *H01M 4/623* (2013.01); *H01M 10/0525* (2013.01); *H01M 2004/027* (2013.01)

(58) Field of Classification Search
CPC .............................. H01M 4/622; H01M 4/623
See application file for complete search history.

(56) References Cited

U.S. PATENT DOCUMENTS

2022/0037655 A1* 2/2022 Kaseyama ............ H01M 4/139

FOREIGN PATENT DOCUMENTS

JP H07-201315 A 8/1995
JP 2011-181354 A 9/2011
(Continued)

OTHER PUBLICATIONS

International Search Report for PCT/KR2022/012603 mailed Nov. 28, 2022 from Korean Intellectual Property Office.
(Continued)

*Primary Examiner* — Christopher P Domone
(74) *Attorney, Agent, or Firm* — Paratus Law Group, PLLC

(57) ABSTRACT

There is provided a binder for a secondary battery anode, in which double-bond functional groups are selectively formed
(Continued)

in a fluorine-based polymer by using an organic catalyst, and a cross-linked structure can be formed by the double bonds through only an electrode drying process without the introduction of a heterogeneous additive.

14 Claims, 6 Drawing Sheets

(56) References Cited

FOREIGN PATENT DOCUMENTS

| | | | |
|---|---|---|---|
| KR | 10-2015-0000063 | A | 1/2015 |
| KR | 10-2059432 | B1 | 12/2019 |

OTHER PUBLICATIONS

Xiongjie Li et al., "Enhanced energy storage density of all-organic fluoropolymer composite dielectric via introducing crosslinked structure", RSC Advances, Apr. 22, 2021, pp. 15177-15183, vol. 11.
Shaobo Tan et al., "Synthesis of fluoropolymer containing tunable unsaturation by a controlled dehydrochlorination of P(VDF-co-CTFE) and its curing for high performance rubber applications", Journal of Materials Chemistry, Jul. 25, 2012, pp. 18496-18504, vol. 22.

* cited by examiner

PVTD 150
PVTD
Weight (%)
100
80
60
40
20
0
200 300 400 500 600
Temprature (°C)

BINDER FOR SECONDARY BATTERY ANODE, METHOD FOR PREPARING SAME, AND SECONDARY BATTERY ANODE USING SAME

CROSS-REFERENCE TO RELATED APPLICATIONS

This Application is a National Stage Patent Application of PCT International Application No. PCT/KR2022/012603 (filed on Aug. 23, 2022), which claims priority to Korean Patent Application No. 10-2021-0111690 (filed on Aug. 24, 2021), which are all hereby incorporated by reference in their entirety.

BACKGROUND

The present disclosure relates to a binder for a secondary battery anode, a method for preparing the same, and a secondary battery anode using the same, and more particularly, to a binder for a secondary battery anode that can selectively form double bond functional groups on a fluorine-based polymer using an organic catalyst, and form a cross-linked structure from the double bonds only through a process of drying an electrode without the introduction of a heterogeneous additive, a method for preparing the same, and a secondary battery anode using the same.

A lithium secondary battery, which is one of secondary batteries, including not only a secondary battery using a lithium metal but also a lithium-ion secondary battery has high voltage and energy density, and is attracting attention as a power source for driving an electronic device. The lithium secondary battery includes a cathode, an anode, an electrolyte, a separator, and the like, wherein lithium ions in the electrolyte move to the anode during charging and to the cathode during discharging and cause a chemical reaction while emitting or absorbing excess electrons at each electrode to generate electrical energy.

An anode material of a conventional lithium secondary battery contains lithium oxide, a cathode material thereof contains a carbon-based material such as graphite that can store lithium ions, the separator prevents direct contact between the cathode and the anode, and the electrolyte serves as a medium that allows lithium ions to move between the cathode and the anode.

In recent years, technologies to increase the reversible capacity of secondary batteries by changing the anode material of secondary batteries from a carbon-based material to a silicon-based material are being studied. Silicon-based materials exist abundantly in nature and have a high theoretical specific charge capacity (4,200 mAh/g), and thus are considered promising substitutes for carbon-based materials.

However, when charging and discharging a secondary battery, an electrode element is deintercalated due to volume expansion and contraction of the silicon-based material, thereby having a problem of greatly reducing battery life. A commonly used polyvinylidene fluoride binder does not prevent pulverization of silicon particles due to its weak binding force and has limitations in attaching an electrode element to a current collector, resulting in serious deterioration of the battery.

To solve this problem, when an anode material is prepared using a binder containing polyacrylic acid as a binder for a silicon-based anode of a secondary battery, a sedimentation phenomenon of solid content occurs in a solvent, and thus there is a problem in that the electrode density of an anode prepared by applying the anode material in which the sedimentation phenomenon has occurred to the current collector becomes non-uniform.

In addition, when using an anode material containing a binder containing polyamideimide as a binder for a silicon-based anode of a secondary battery, the sintering temperature of the anode material containing polyamideimide is very high compared to that of the anode material containing polyacrylic acid, thereby having a problem of greatly deteriorating manufacturing process characteristics.

Therefore, in order to solve the above-mentioned problems, the present inventors recognized that it was urgent to develop a binder for a secondary battery anode that enables the manufacture of electrodes under existing process conditions and has excellent electrochemical properties, and completed the present disclosure.

SUMMARY

An aspect of the present disclosure is to provide a binder for a secondary battery anode with improved mechanical performance such as tensile strength and Young's modulus by forming a cross-linked structure only through an electrode drying-heat treatment process without an additional cross-linking agent, and a method for preparing the same.

Another aspect of the present disclosure is to provide a secondary battery anode that enables the stable aggregation of an electrode element during long-term charging and discharging, has high cycle stability under various current densities, and has high coulombic efficiency without side reactions, a method for preparing the same, and a secondary battery using the same.

Technical problems to be solved in the present disclosure are not limited to the above-mentioned problems and other technical problems which are not mentioned herein will definitely be understood by those skilled in the art from the following description.

In order to achieve the above objectives, the present disclosure provides a binder for a secondary battery anode, a method of preparing the same, a secondary battery anode using the same, a method for preparing the same, and a secondary battery using the same.

Hereinafter, this specification will be described in more detail.

The present disclosure provides a binder for a secondary battery anode having a structure of the following [Formula 1].

[Formula 1]

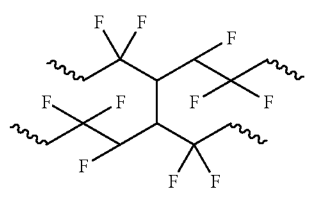

In addition, the present disclosure provides a method for preparing a binder for a secondary battery anode including the following steps of:

(A1) dissolving a fluorine-based polymer in an organic solvent to prepare a melt;

(A2) adding a catalyst to the melt to prepare a compound represented by the following [Formula 2] in which a double bond is formed; and (A3) heat-treating the compound represented by the above [Formula 2] to prepare a cross-linked binder for a secondary battery anode represented by the following [Formula 1].

[Formula 1]

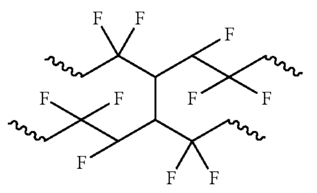

[Formula 2]

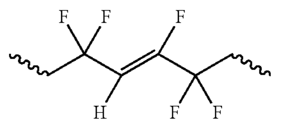

In the present disclosure, the step (A1) may be performed by mixing a fluorine-based polymer and an organic solvent at a weight ratio of 5 to 20:80 to 95 (fluorine-based polymer: organic solvent) to prepare a melt.

In the present disclosure, the fluorine-based polymer may be poly(vinylidene fluoride-co-chlorotrifluoroethylene) (P(VDF-CTFE)).

In the present disclosure, the organic solvent may be methylpyrrolidone (N-Methyl-2-pyrrolidone, NMP).

In the present disclosure, the step (A2) may include the following steps.

(A2A) adding a catalyst to the melt and then reacting with each other; and (A2B) precipitating the melt to which the catalyst has been added to prepare a compound represented by the above [Formula 2].

In the present disclosure, the step (A2A) may be performed by mixing the melt and the catalyst at a weight ratio of 1 to 20:80 to 99 (fluorine-based polymer:organic solvent).

In the present disclosure, the catalyst may be triethylamine (TEA).

In the present disclosure, the acid may be at least one selected from a group consisting of hydrochloric acid (HCl), nitric acid ($HNO_3$), boric acid ($H_3BO_3$), perchloric acid ($HClO_4$), acetic acid ($C_2H_4O_2$) and phosphoric acid ($H_3PO_4$).

In the present disclosure, the step (A3) may be performed by heat-treating the compound represented by the above [Formula 2] at 100 to 180° C. in a vacuum state to prepare a cross-linked binder for a secondary battery anode represented by the above [Formula 1].

In addition, the present disclosure may provide a secondary battery anode containing a compound represented by the following [Formula 1].

[Formula 1]

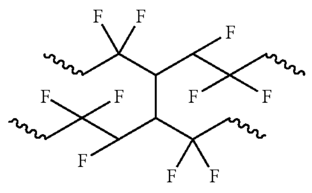

In addition, the present disclosure may provide a method for preparing a secondary battery anode, including mixing a binder for a secondary battery anode, an anode active material, and a conductive agent represented by the following [Formula 1].

[Formula 1]

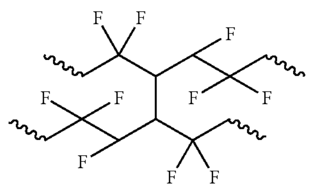

In present disclosure, 5 to 30% by weight of a compound represented by the above [Formula 1]; 50 to 90% by weight of an anode active material; and 5 to 20% by weight of a conductive agent may be mixed.

In addition, a secondary battery including the secondary battery anode may be provided.

All matters mentioned in the binder for a secondary battery anode, the method for preparing the same, the secondary battery anode using the same, the method for preparing the same, and the secondary battery using the same are equally applicable unless they are not contradictory to one another.

A binder for a secondary battery anode in the present disclosure and a method for preparing the same may form a stable network structure using only an electrode drying process without an additional cross-linking agent, thereby improving mechanical performance such as tensile strength and Young's modulus.

In addition, a secondary battery anode containing a binder for a secondary battery anode in the present disclosure and a secondary battery using the same may form a uniform electrode, and suppress volume expansion within the electrode during charging and discharging, resulting in fewer cracks to have high cycle stability under various current densities, thereby exhibiting high-capacity retention rate compared to its initial capacity.

The effects of the present disclosure are not limited to the above-mentioned effects, and other effects that are not mentioned herein will be clearly understood by those skilled in the art from the description of the claims.

DETAILED DESCRIPTION

Figure 1:
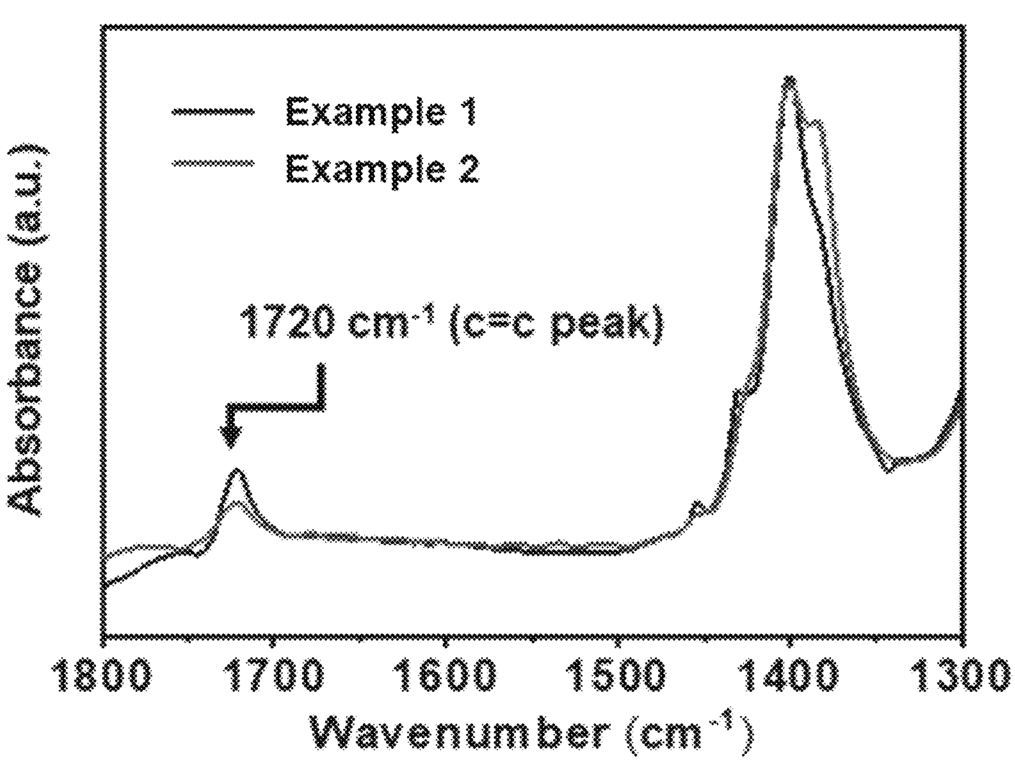
FIG. 1 is an FT-IR spectrum showing a binder for a secondary battery anode prepared in Example 1 (black line) and a cross-linked binder applied to a secondary battery anode prepared in Example 2 (red line).

Although the terms used herein are selected from generally known and used terms considering their functions in the present disclosure, the terms may be modified depending on intention of a person skilled in the art, practices, or the advent of new technology. Besides, in a specific case, some terms may be arbitrarily chosen by the present applicant, and in this case, the meanings of those terms will be described in corresponding parts of the present disclosure in detail. Accordingly, the terms used herein should be understood not simply by the actual terms used but by the meaning lying within and the description disclosed herein.

Unless defined otherwise, the terms used herein including technological or scientific terms have the same meaning that is generally understood by those skilled in the art to which the present disclosure pertains. The terms used herein shall not be interpreted not only based on the definition of any dictionary but also the meaning that is used phase the field to which the invention pertains, and shall not be interpreted too ideally or formally unless clearly defined herein.

A numerical range includes numerical values defined in the above range. All maximum numerical limits given throughout this specification include all lower numerical limits as if the lower numerical limits are clearly written. All minimum numerical limits given throughout this specification include all higher numerical limits as if the higher numerical limits are clearly written. All numerical limits given throughout this specification will include all better numerical ranges within a broader numerical range, as if narrower numerical limits are clearly written.

Hereinafter, examples of the present disclosure will be described in detail, but it is apparent that the present disclosure is not limited to the following examples.

Binder for Secondary Battery Anode and Method for Preparing Same

The present disclosure provides a binder for a secondary battery anode having a structure of the following [Formula 1].

[Formula 1]

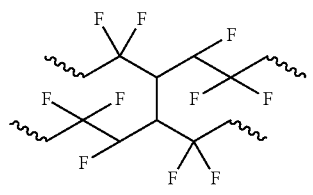

The binder for a secondary battery anode according to the present disclosure may improve mechanical performance such as tensile strength and Young's modulus.

In addition, the present disclosure provides a method for preparing a binder for a secondary battery anode including the following steps of:

(A1) dissolving a fluorine-based polymer in an organic solvent to prepare a melt;

(A2) adding a catalyst to the melt to prepare a compound represented by the following [Formula 2] in which a double bond is formed; and (A3) heat-treating the compound represented by the above [Formula 2] to prepare a cross-linked binder for a secondary battery anode represented by the following [Formula 1].

[Formula 1]

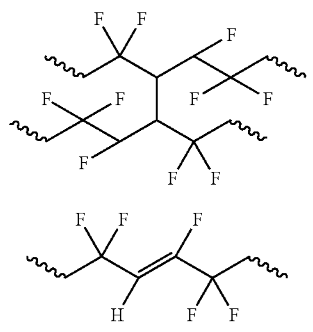

[Formula 2]

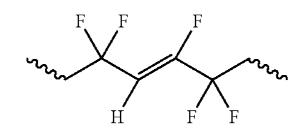

The step (A1) may be performed by mixing the fluorine-based polymer and the organic solvent at a weight ratio of 5 to 20:80 to 95 (fluorine-based polymer:organic solvent) to prepare a melt, and preferably, by mixing the fluorine-based polymer and the organic solvent in a weight ratio of 5 to 15:85 to 95 (fluorine-based polymer:organic solvent) to prepare a melt.

The fluorine-based polymer may be poly(vinylidene fluoride-co-chlorotrifluoroethylene) (P(VDF-CTFE)) containing chlorine atoms (chlorine (Cl)), and may have a structure below.

[Structure of P (VDF-CTFE)]

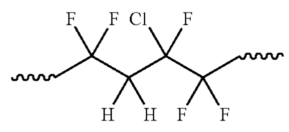

The organic solvent may be a polar solvent, preferably an organic solvent having an amine group, and most preferably methylpyrrolidone (N-Methyl-2-pyrrolidone, NMP). As the polarity of the organic solvent is strong, HCl desorption may be fast, thereby improving the dehydrochlorination while minimizing the use of a catalyst, which will be described later.

The step (A1) may be performed under an inert gas, and the inert gas may be argon gas.

The step (A2) may be performed by adding a catalyst to the melt to prepare a compound represented by the following [Formula 1] in which a double bond is formed, and may include the follow steps.

(A2A) adding a catalyst to the melt and then reacting with each other; and (A2B) precipitating the melt to which the catalyst has been added to prepare a compound represented by the above [Formula 2].

More specifically, the (A2A) step may be performed by adding a catalyst to a melt in which a fluorine-based polymer is dissolved in an organic solvent, the melt and the catalyst may be mixed at a molar ratio of 1 to 20:80 to 99 (melt: catalyst), and preferably, the melt and the organic catalyst may be mixed at a molar ratio of 10 to 20:80 to 90 (melt:organic catalyst).

The catalyst may be an organic catalyst containing an amine group, preferably an organic catalyst, and most preferably triethylamine (TEA).

The step (A2A) may be performed under an inert gas, and the inert gas may be argon gas.

In addition, the step (A2A) may be performed by mixing the melt and the catalyst while stirring at 30 to 60° C. at a speed of 100 to 1,000 rpm for 12 to 120 hours.

The step (A2B) may be performed by preparing a compound represented by [Formula 2], and more specifically, alcohol may be added to the catalyst-added melt to form a precipitate. Then, the precipitate may be re-dissolved in an organic solvent and reprecipitation may be repeated three or more times.

The alcohol may be at least one selected from a group consisting of methanol, ethanol, isopropanol, butanol, and isobutanol, and the organic solvent may be at least one selected from a group consisting of tetrahydrofuran (THF) and acetone.

The reprecipitation may be performed by additionally adding an acid, and the acid is may be at least one selected from a group consisting of hydrochloric acid (HCl), nitric acid ($HNO_3$), boric acid ($H_3BO_3$), perchloric acid ($HClO_4$), acetic acid ($C_2H_4O_2$) and phosphoric acid ($H_3PO_4$), and preferably, at least one selected from a group consisting of hydrochloric acid (HCl) and nitric acid ($HNO_3$) and acetic acid ($C_2H_4O_2$).

Subsequent to performing the step (A2B), drying the obtained precipitate may be additionally included.

The drying may be performed at 30 to 80° C. for 12 to 120 hours in a vacuum state, and preferably, at 40 to 70° C. for 12 to 72 hours in a vacuum state.

The step (A3) may be finally performed by preparing a binder for a secondary battery anode represented by the above [Formula 1], and more specifically, by heat-treating the compound represented by the above [Formula 2] at 100 to 180° C. in a vacuum state to prepare a cross-linked binder for a secondary battery anode represented by the above [Formula 1].

Secondary Battery Anode and Method for Preparing Same

A secondary battery anode containing a compound represented by the following [Formula 1] is provided.

[Formula 1]

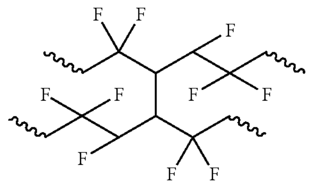

A secondary battery anode containing a binder for a secondary battery anode of the present disclosure may have high cycle stability under various current densities to exhibit a high-capacity retention rate compared to its initial capacity.

In addition, the present disclosure may provide a method for preparing a secondary battery anode, including mixing a binder for a secondary battery anode, an anode active material, and an agent represented by the above [Formula 1].

The secondary battery anode may be prepared by mixing 5 to 30% by weight of a compound represented by the above [Formula 1]; 50 to 90% by weight of an anode active material; and 5 to 20% by weight of a conductive agent.

The anode active material may be at least one selected from a group consisting of silicon, silicon oxide, a composite of silicon and a carbon material, and a composite of silicon oxide and a carbon material, but is not limited thereto as long as it is a material that can be applied as an anode active material for a secondary battery.

The conductive agent, which is a material added for the purpose of improving electronic conductivity between the anode active material particles or to the metal current collector in the secondary battery anode, may be Super P, acetylene black, Ketjen black, and the like, but is not limited thereto as long as it is applicable as a conductive agent for secondary batteries.

The method may additionally include coating the mixture on a current collector.

A secondary battery anode of the present disclosure and a method for preparing the same may control a reaction rate using an organic catalyst with high efficiency and low toxicity, and form a network structure only through an electrode drying process without an additional cross-linking agent, thereby improving mechanical performance such as tensile strength and Young's modulus.

Secondary Battery

The present disclosure provides a secondary battery including a secondary battery anode containing a compound represented by the above [Formula 1].

The secondary battery of the present disclosure may use a cross-linked binder to form a uniform electrode, reduce the occurrence of cracks in the electrode by relieving the volume expansion of silicon, and have high cycle stability under high current density, thereby exhibiting a high-capacity retention rate compared to its initial capacity.

Advantages and features of the present disclosure, and methods of accomplishing the same will be clearly understood with reference to the following embodiments described below in detail. However, the present disclosure is not limited to those embodiments disclosed below but may be implemented in various different forms. It should be noted that the present embodiments are merely provided to make a full disclosure of the invention and also to allow those skilled in the art to know the full range of the invention, and therefore, the present disclosure is to be defined only by the scope of the appended claims.

Example 1. Preparation of Binder for Secondary Battery Anode Represented by [Formula 1]

1.1. Preparation of Compound Represented by [Formula 2]

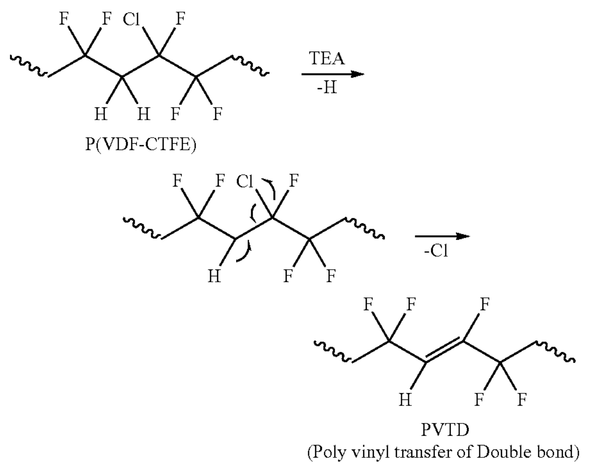

P(VDF-CTFE)
PVTD
(Poly vinyl transfer of Double bond)

Poly(vinylidene fluoride-co-chlorotrifluoroethylene (P(VDF-CTFE), Solef 32008/1001), a fluorine-based polymer, was completely dissolved in an organic solvent at a weight ratio of 10/90 (w/w) while stirring at a speed of 400 rpm for 4 hours in the presence of argon gas to prepare a melt. Triethylamine (TEA), an organic catalyst, was added to the melt at a ratio of [Catalyst]/[Cl]=5:1 and stirred at a speed of 400 rpm for 4 days at 50° C. in the presence of argon gas. Then, hydrochloric acid ($HCl \cdot H_2O$ 3 wt %) was added dropwise to form a precipitate. Then, the precipitate was dissolved again in tetrahydrofuran (THF), and a process of reprecipitating the melt with ethanol (ethanol$\cdot H_2O$ 50 wt %) was repeated three times. The finally prepared precipitate was dried at 50° C. for 24 hours in a vacuum state to prepare a compound represented by the following [Formula 2] in which a double bond was formed.

[Formula 2]

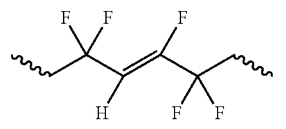

1.2. Preparation of Binder for Secondary Battery Anode Represented by [Formula 1]

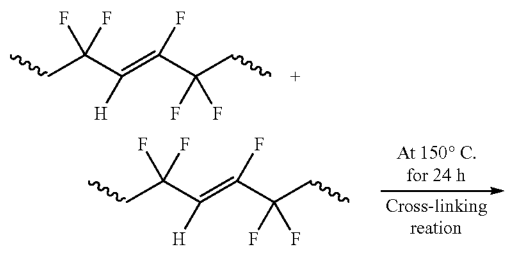

-continued

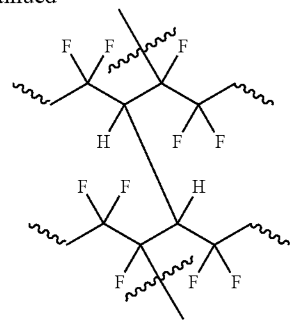

The prepared compound represented by [Formula 2] was heat-treated at 150° C. for 24 hours through a vacuum oven, and the compound represented by [Formula 2] was cross-linked so as to be converted into a binder for a secondary battery anode represented by the following [Formula 1].

[Formula 1]

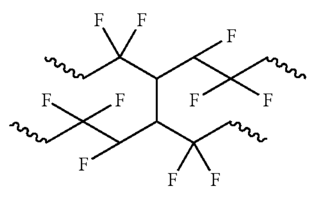

Example 2. Preparation of Secondary Battery Anode

A binder for a secondary battery anode prepared in the above Example 1 was used as an element of the secondary battery anode. A 50 nm-sized silicon active material, the binder, and Super P were mixed at a weight ratio of 6:2:2 to prepare a homogeneous slurry, and the slurry was coated on a current collector using a doctor blade and heat-treated to prepare a secondary battery anode.

Comparative Example 1. Preparation of Comparative Secondary Battery Anode 1 Using Commercial PVDF Binder A comparative secondary battery anode 1 was prepared in the same manner as the above Example 2 using a commercial PVDF binder (polyvinylidene fluoride).

Comparative Example 2. Preparation of Comparative Secondary Battery Anode 2 Using P(VDF-CTFE)

A comparative secondary battery anode 2 was prepared in the same manner as the above Example 2, using non-cross-linked P(VDF-CTFE) having the following structure as a binder for a secondary battery anode.

[Structure of P (VDF-CTFE)]

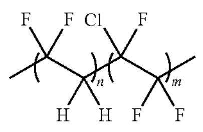

Experimental Example 1. Mechanical Performance and Thermal Stability of Binder for Secondary Battery Anode 1.1. Checking of Mechanical Performance and Thermal Stability According to Presence or Absence of Cross-Linking In order to check the mechanical performance effect and thermal stability of a binder for a secondary battery anode according to the present disclosure (Example 1), films were prepared by casting the binder for a secondary battery anode prepared according to the present disclosure (Example 1, red line) and a non-cross-linked compound represented by the above [Formula 2] (black line) with a solution prepared with NMP, and stress-strain and thermal stability (thermogravimetric analysis (TGA)) were measured for the two films, and were shown in FIGS. 2 and 3.

Figures 2, 3:
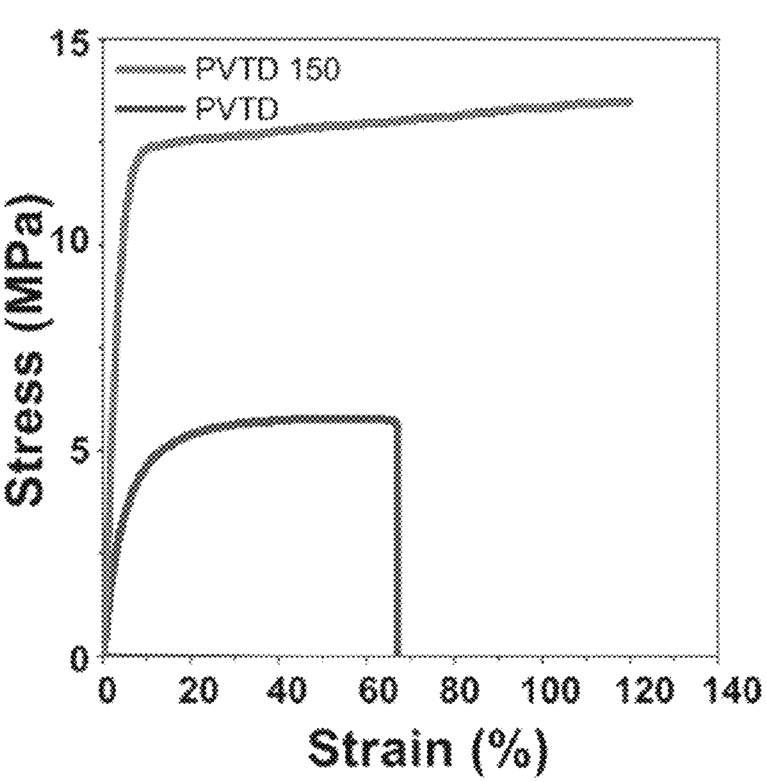
FIG. 2 is a graph showing stress-strain curves of a binder for a secondary battery anode prepared according to the present disclosure (Example 1, red line) and a non-cross-linked compound represented by the above [Formula 2] (black line).
FIG. 3 is a graph showing a graph showing thermogravimetric analysis (TGA) curves of a binder for a secondary battery anode prepared according to the present disclosure (Example 1, red line) and a non-cross-linked compound represented by [Formula 2] (black line).

Referring to FIG. 2, when the binder for a secondary battery anode (Example 1, red line) having a structure of the above [Formula 1] with the non-cross-linked compound represented by the above [Formula 2] (black line), it can be seen that tensile strength and Young's modulus were improved due to the presence of cross-linking. Furthermore, referring to FIG. 3, when the binder for a secondary battery anode (Example 1) having a structure of the above [Formula 1] with the non-cross-linked compound represented by the above [Formula 2] (black line), it can be seen that thermal stability was increased due to the presence of cross-linking.

The above results show that the binder for a secondary battery anode according to the present disclosure (Example 1) had improved mechanical performance by cross-linking, which was said to suggest that when applied to secondary batteries, the volume expansion of silicon may be effectively suppressed to reduce the pulverization of silicon.

1.2. Checking of Mechanical Performance Compared to Existing Binder for Secondary Battery Anode In order to check the mechanical performance effect and thermal stability of the binder for a secondary battery anode according to the present disclosure (Example 1), films made through melt processing of the binder for a secondary battery anode according to the present disclosure (Example 1, red line), the commercial PVDF binder and P(VDF-CTFE) used in Comparative Example 1 (black line) and Comparative Example 2 (blue line) at 150° C. and 20 MPa were heat-treated at 150° C. for 24 hours, and compared for stress-strain, and were shown in FIG. 4.

Figure 4:
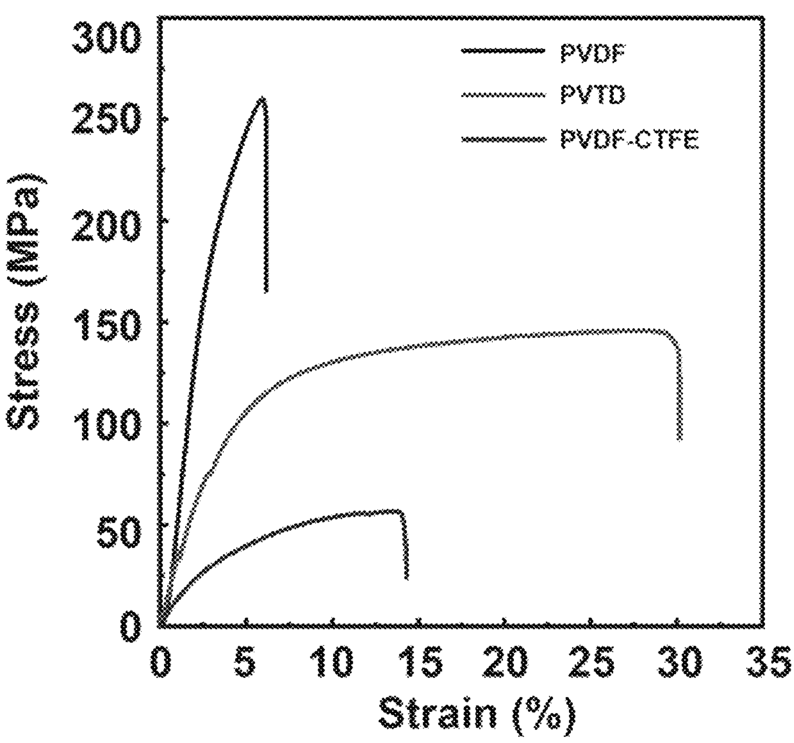
FIG. 4 shows a graph showing stress-strain curves of a binder for a secondary battery anode according to the present disclosure (Example 1, red line), a binder of Comparative Example 1 (black line), and a binder of Comparative Example 2 (blue line).

Referring to FIG. 4, it can be seen that when the binder for a secondary battery anode having a structure of the above [Formula 1] according to the present disclosure (Example 1, red line) had much higher tensile strength compared to those of conventional binders used in Comparative Example 1 (black line) and Comparative Example 2 (blue line).

The above results show that the binder for a secondary battery anode according to the present disclosure (Example 1) had improved tensile strength compared to the existing binder for a secondary battery anode, which was said to suggest that when applied to secondary batteries, destruction due to the volume expansion of silicon may be reduced.

Experimental Example 2. Capacity and Cycle Stability According to Current Density 2032 type coin cells were assembled in a glove box using secondary battery anodes containing binders for a secondary battery prepared in the above Example 2, Comparative Example 1, and Comparative Example 2. Lithium metal was used as the counter electrode, and a solution added with 10% FEC additive was used as an electrolyte in an EC:DEC=50:50 (v/v) solution added with 1.0 M $LiPF_6$ lithium salt. For the assembled cells, charging and discharging were performed in a voltage range of 0.01-1.2 V using a battery cycler (Biologic BCS-805) at room temperature for 5 cycles each with current densities of 0.1, 0.2, 0.5, 1, 2, 3, 4, and 5 A/g, and the results are shown in FIG. 5.

Figure 5:
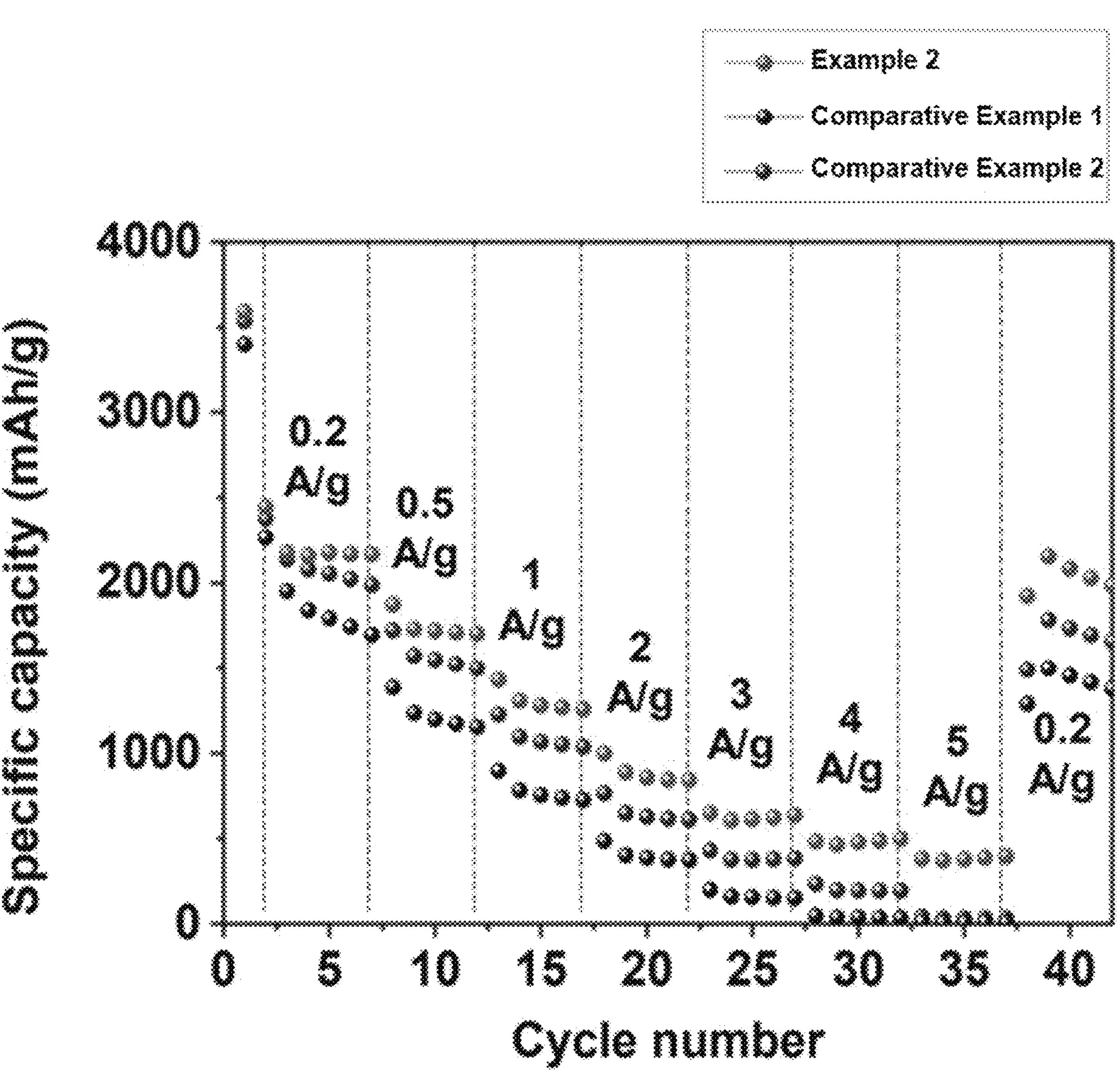
FIG. 5 is a graph showing capacity and cycle stability according to current densities of secondary batteries prepared in Example 2, Comparative Example 1, and Comparative Example 2.

Referring to FIG. 5, it can be seen that a secondary battery including a secondary battery anode according to the present disclosure (Example 2) had a significantly higher capacity, and a low-capacity decay as current density increases compared to comparative secondary battery 1 using a commercial binder (Comparative Example 1) and comparative secondary battery 2 using non-cross-linked P(VDF-CTFE) (Comparative Example 2). In addition, it can be seen that when returning to the current density of 0.2 A/g, the secondary battery according to the present disclosure exhibits high retention to have excellent capacity reversibility. From the above results, it can be seen that the application of the cross-linked fluorine-based binder of the present disclosure had improved capacity and cycle stability.

Experimental Example 3. Long Life of Secondary Battery 100 cycles of charging and discharging were performed at a current density of 1 A/g for secondary batteries prepared using secondary battery anodes prepared in the above Example 2, Comparative Example 1, and Comparative Example 2 to measure long-term life characteristics and charge/discharge efficiency (coulombic efficiency, %), and were shown in FIG. 6.

Figure 6:
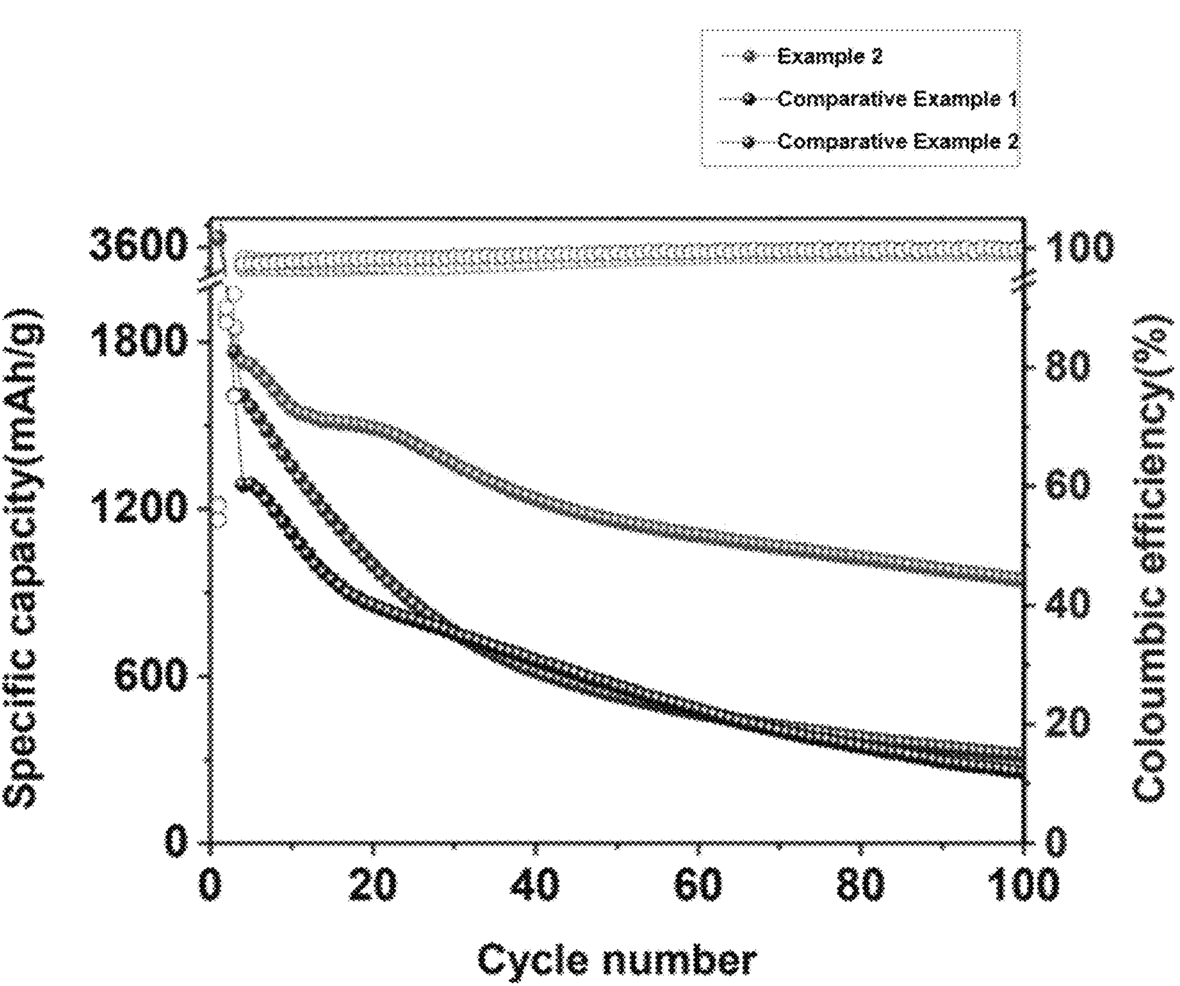
FIG. 6 is a graph showing long-term life characteristics and coulombic efficiency of secondary batteries prepared in Example 2, Comparative Example 1, and Comparative Example 2.

Referring to FIG. 6, it can be seen that a secondary battery including a secondary battery anode according to the present disclosure (Example 2) exhibits the highest capacity retention rate after 100 cycles and has a coulombic efficiency of over 98% compared to initial capacities of comparative secondary battery 1 using a commercial binder (Comparative Example 1) and comparative secondary battery 2 using non-cross-linked P(VDF-CTFE) (Comparative Example 2).

From the above results, it was proved that by applying the cross-linked fluorine-based binder of the present disclosure, a volume change of silicon may be suppressed through an excellent bonding force, thereby extending the life of the secondary battery.

Experimental Example 4. Electrode Volume Expansion Rate

In order to measure the morphology and volume expansion degree of a silicon electrode in a secondary battery including the secondary battery anode according to the present disclosure, charging and discharging were performed for 10 cycles at a current density of 1 A/g using secondary battery anodes prepared in the above Example 2, Comparative Example 1, and Comparative Example 2. In this case, images were taken of the cross-sections of silicon anodes before and after 10 cycles using a scanning electron microscope (SEM, Supra 25), and were shown in FIG. 7.

Figure 7:
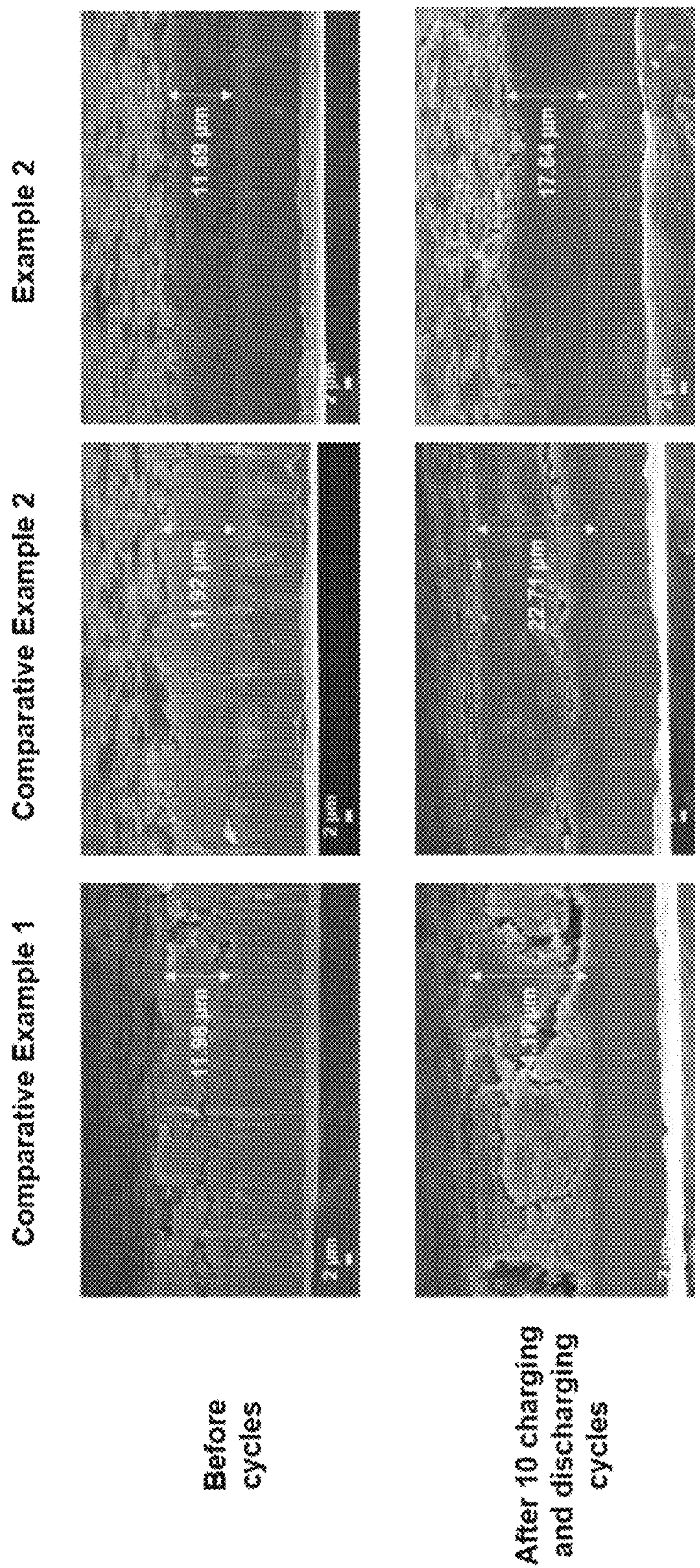
FIG. 7 is a scanning electron microscope (SEM) image showing a volume expansion rate of a silicon electrode before and after 10 charging and discharging cycles for secondary batteries prepared in Example 2, Comparative Example 1, and Comparative Example 2.

Referring to FIG. 7, it can be seen that a degree of volume expansion of a silicon electrode in the secondary battery of the above Comparative Example 1 is 101.92%, and a degree of volume expansion of a silicon electrode in the secondary battery of the above Comparative Example 2 is 90.52%. On the other hand, it can be seen that a degree of volume expansion of a silicon electrode in the secondary battery according to the present disclosure (Example 2) is 52.90%, which has a significant difference compared to the above Comparative Examples 1 and 2. In particular, it can be seen that a reduction in volume expansion is approximately twice compared to that of Comparative Example 1 using a commercial binder.

The above results confirmed that a network structure formed by a cross-linked binder according to the present disclosure may suppress volume expansion during charging and discharging to alleviate cracking of the electrode, and have an excellent capacity retention rate depending on the cycle.

From the above description, it may be understood by those skilled in the art that the foregoing present disclosure can be implemented in other specific forms without changing the technical concept and essential characteristics thereof. In this regard, it should be understood that embodiments described above are illustrative but not restrictive in all aspects.

The invention claimed is:

1. A binder for a secondary battery anode having a structure of the following [Formula 1]

[Formula 1]

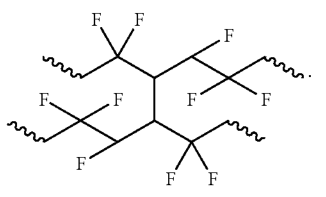

2. A method for preparing a binder for a secondary battery anode, the method comprising:

(A1) dissolving a fluorine-based polymer in an organic solvent to prepare a melt;

(A2) adding a catalyst to the melt to prepare a compound represented by the following [Formula 2] in which a double bond is formed; and (A3) heat-treating the compound represented by the above [Formula 2] to prepare a cross-linked binder for a secondary battery anode represented by the following [Formula 1]

[Formula 1]

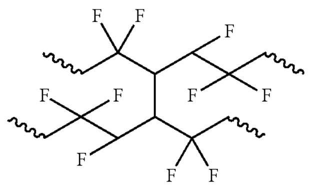

[Formula 2]

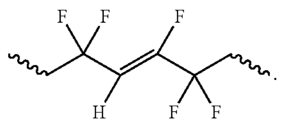

3. The method of claim 2, wherein the step (A1) is performed by mixing a fluorine-based polymer and an organic solvent at a weight ratio of 5 to 20:80 to 95 (fluorine-based polymer:organic solvent) to prepare a melt.

4. The method of claim 2, wherein the fluorine-based polymer is poly(vinylidene fluoride-co-chlorotrifluoroethylene) (PVDF-CTFE).

5. The method of claim 2, wherein the organic solvent is methylpyrrolidone (N-Methyl-2-pyrrolidone, NMP).

6. The method of claim 2, wherein the step (A2) comprises:

(A2A) adding a catalyst to the melt; and (A2B) precipitating the melt to which the catalyst has been added to prepare a compound represented by the above [Formula 2].

7. The method of claim 6, wherein the step (A2A) is performed by mixing the melt and the catalyst at a weight ratio of 1 to 20:80 to 99 (fluorine-based polymer:organic solvent).

8. The method of claim 2, wherein the catalyst is triethylamine (TEA).

9. The method of claim 6, wherein the acid is at least one selected from a group consisting of hydrochloric acid (HCl), nitric acid ($HNO_3$), boric acid ($H_3BO_3$), perchloric acid ($HClO_4$), acetic acid ($C_2H_4O_2$) and phosphoric acid ($H_3PO_4$).

10. The method of claim 6, wherein the compound represented by the above [Formula 2] is heat-treated at 100 to 180° C. in a vacuum state to prepare a cross-linked binder for a secondary battery anode represented by the above [Formula 1].

11. A secondary battery anode comprising a compound represented by the following [Formula 1]

[Formula 1]

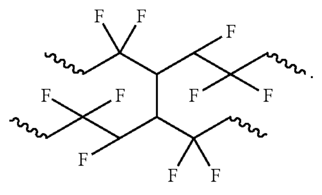

12. A secondary battery comprising a secondary battery anode according to claim 11.

13. A method for preparing a secondary battery anode comprising:

mixing a binder for a secondary battery anode represented by the following [Formula 1], an anode active material, and a conductive agent to prepare a secondary battery anode

[Formula 1]

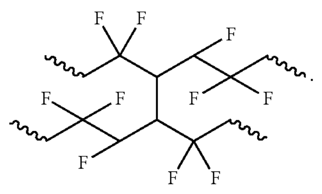

14. The method of claim 13, wherein 5 to 30% by weight of a compound represented by the above [Formula 1]; 50 to 90% by weight of an anode active material; and 5 to 20% by weight of a conductive agent are mixed.

* * * * *